Jan. 26, 1971 W. B. BURKETT ET AL 3,559,025
RAPID CHARGING OF BATTERIES
Filed July 15, 1968 2 Sheets-Sheet 2
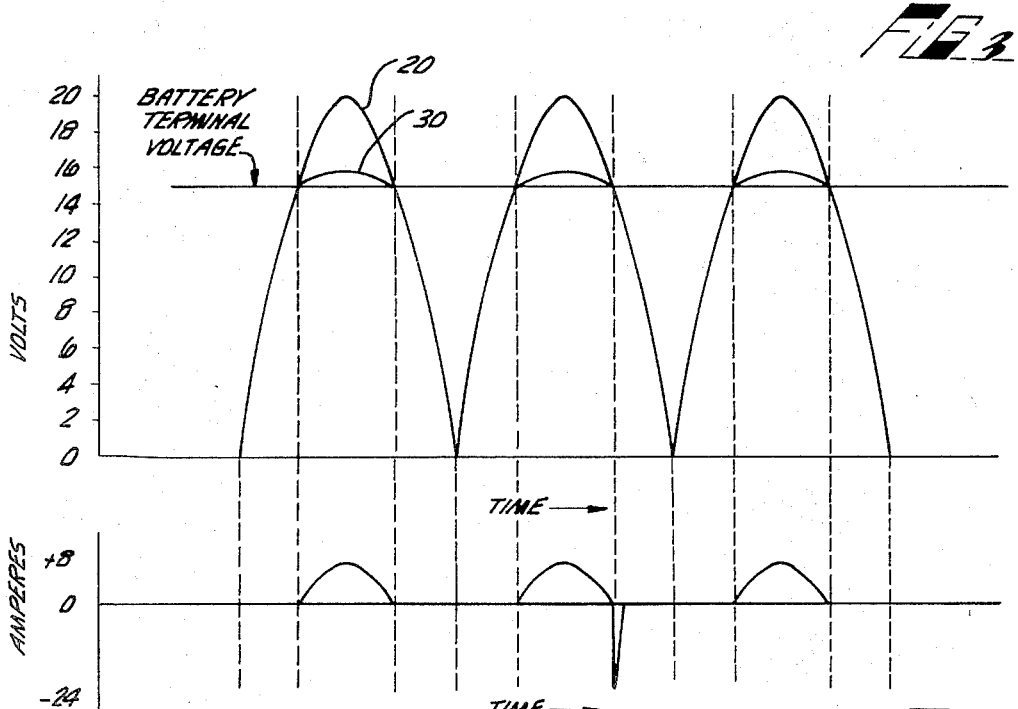
FIG. 3
FIG. 4
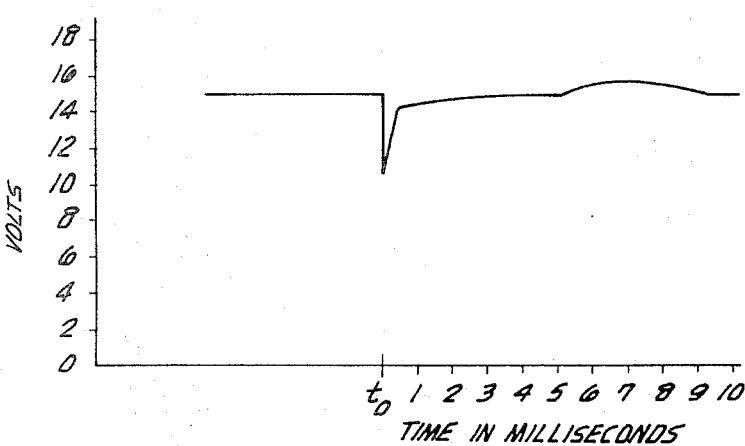
FIG. 5
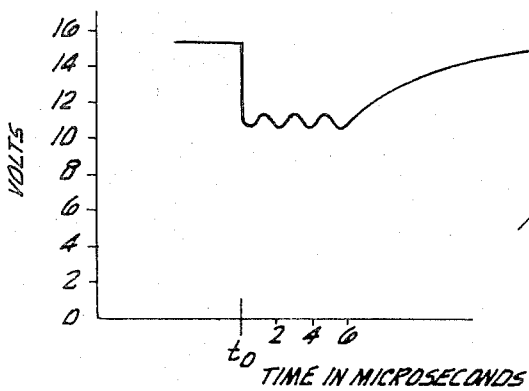
FIG. 6
INVENTORS.
WILFORD B. BURKETT
JOHN BIGBEE, III
BY
Christie, Parker & Hale
ATTORNEYS United States Patent Office 3,559,025
Patented Jan. 26, 1971

3,559,025
RAPID CHARGING OF BATTERIES
Wilford B. Burkett, Palisades, and John Bigbee III, Los Angeles, Calif., assignors, by mesne assignments, to McCulloch Corporation, Los Angeles, Calif., a corporation of Wisconsin
Continuation-in-part of applications Ser. No. 612,995, Jan. 31, 1967, and Ser. No. 726,060, May 2, 1968. This application July 15, 1968, Ser. No. 744,902
Int. Cl. H02j 7/10
U.S. Cl. 320—14                             18 Claims

ABSTRACT OF THE DISCLOSURE

A battery is charged in a very short period of time, for example less than fifteen minutes, by applying a charging current that is in excess of the nominal one-hour rate of the battery with discharge pulses sandwiched between charge pulses, with or without a rest period between the end of the charge pulse and the beginning of a discharge pulse and the end of the discharge pulse and the beginning of a charge pulse. The discharge pulse has a peak value in excess of the nominal one-hour rate of the battery and the pulse has a short period, for example one to four microseconds, which time may be related to the time associated with the electrochemical characteristics and construction of the cell or cells of the battery being charged. The frequency of the interruptions is increased as the terminal voltage and charge of the battery increases. The charging at the high rate is terminated or converted to a trickle charge when the terminal voltage of the battery exceeds a selected voltage level associated with the desired level of charge in the battery. The disclosure relates to both the method of rapid charge and apparatus for rapid charging.

CROSS-REFERENCES TO RELATED APPLICATIONS

The invention herein is related to those disclosed and claimed in the copending United States applications Ser. No. 612,995, filed Jan 31, 1967, now U.S. Pat. No 3,517,-293, issued June 23, 1970, and Ser. No. 726,060, filed May 2, 1968, and assigned to the same assignee as this application, and this invention constitutes an improvement in the step of terminating the rapid charging disclosed in these applications, and an improvement in the rapid charging method and apparatus of both applications, in simplification of circuitry and reduction in cost.

BACKGROUND OF THE INVENTION

Field of the invention

This invention relates to a method and apparatus for quick-charging batteries and is particularly adapted to the charging of batteries in a minimum amount of time.

The charging of batteries to substantially rated capacity in less than an hour had apparently not been accomplished prior to the discovery and method of charging batteries disclosed in the above-identified applications. By the methods and means for rapid charging batteries of these applications, batteries comprised of one or more cells can be charged to at least the rated capacity in less than twenty minutes.

SUMMARY OF THE INVENTION

It has now been found that batteries can be charged to the rated capacity in less than fifteen minutes without a significant increase in battery temperature by employing the method and means of the present invention. Additionally, the high current required for rapid charging may be either terminated or converted to a low level for trickle charging by a simple circuit that monitors the terminal voltage of the battery.

Thus, in accordance with the present invention, batteries comprised of one or more cells are charged in a very short period of time, for example, less than fifteen minutes, by employing the method that comprises the steps of (1) applying charge current pulses that have an average value that is greater than the nominal one-hour rate of the battery, and (2) intermittently discharging the battery between charge current pulses, with the discharge current pulses having a peak value greater than the nominal one-hour rate of the battery. The discharge current pulse is sandwiched between charge current pulses, with or without a rest period between the end of the charge pulse and the beginning of a discharge pulse and the end of the discharge pulse and the beginning of the next charge pulse. The period of the discharge current pulse may advantageously be related to a time associated with the electrochemical characteristics and construction of the cell or cells of the battery being charged.

The method includes the additional step of terminating the charge at the high current rate or converting to a low current rate for trickle charge when a selected battery terminal voltage is attained, which terminal voltage is related to the charge condition of the battery.

Further, in accordance with the present invention, batteries are charged in a short period of time with little temperature rise by employing an apparatus, to perform the above method, that includes a power source for supplying charge current pulses, a first controllable switch coupled between the power source and the battery, a second controllable switch connected across the battery, a means responsive to a selected level of battery terminal voltage for controlling the operation of said second controllable switch to discharge the battery. The apparatus may further include a means responsive to a preselected level of voltage connected across the battery for inhibiting said first controllable switch upon the occurrence of the preselected voltage at the terminals of the battery to terminate the rapid charging of the battery. A relatively high resistance path, which may include an indicator lamp, may also be connected across said first controllable switch to provide a trickle charge path at the conclusion of rapid charging. Additionally, the apparatus may further include a network for preventing the closing of the second switch during the application of a charging current pulse to prevent short circuiting the power source. Also, the apparatus may include a temperature compensation network to make the apparatus sensitive to the same selected voltage across the battery for changes in the ambient temperature of the apparatus, apart from the battery temperature.

BRIEF DESCRIPTION OF THE DRAWINGS

The above and other features and advantages of the present invention may be understood more clearly and fully upon consideration of the following specification and drawings, in which:

FIG. 3 is a graph showing the relationship of the pulsating direct-current voltage and the battery terminal voltage;

FIG. 4 is a graph showing the relationship of the charging current and the discharging current to the pulsating direct current voltage shown on the graph of FIG. 3;

FIG. 5 is a graph having an expanded time base showing the variation in battery terminal voltage during a discharge current pulse; and FIG. 6 is a graph showing the variation in battery terminal voltage during a discharge current pulse relative to an expanded time base.

DESCRIPTION OF THE PREFERRED EMBODIMENT

Figure 1:
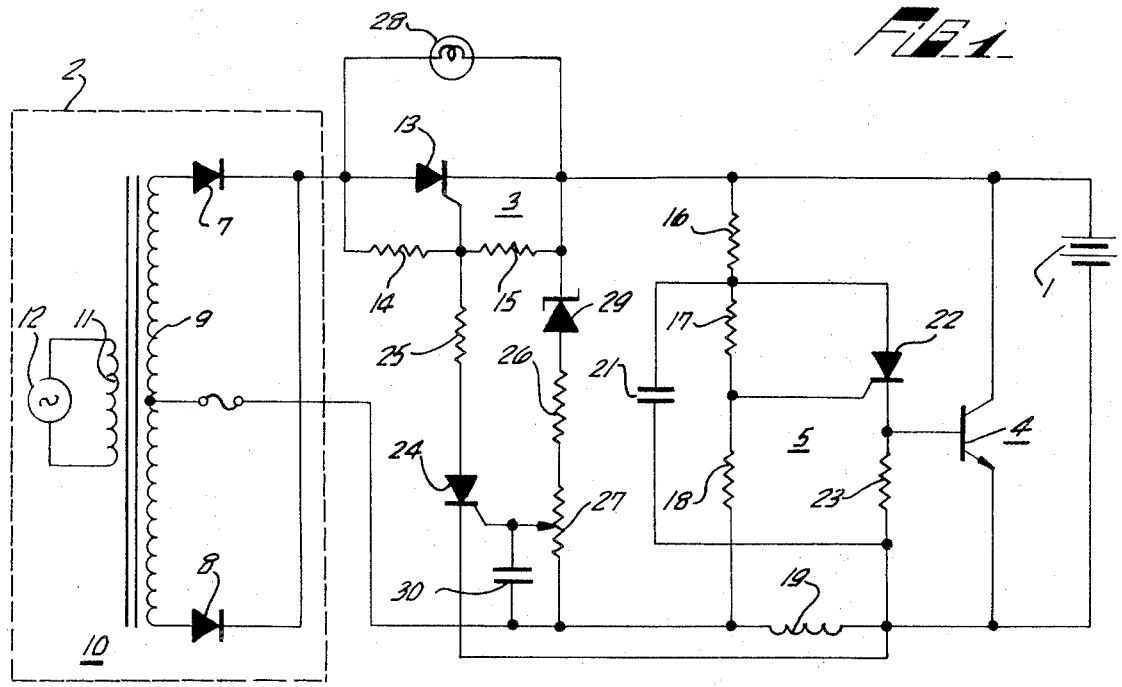
FIG. 1 is a schematic circuit diagram of an apparatus for quick-charging a battery in accordance with the present invention.

In the majority of the applications where batteries or other rechargeable electrochemical power sources are employed as a power source, it is desirable to charge the power source in the shortest possible time. A schematic circuit of a preferred embodiment of an apparatus for charging such power sources, and, in particular, batteries that have one or more cells, in a very short period of time, for example, in less than fifteen minutes, with very little increase in battery temperature, is shown in FIG. 1.

The apparatus for quick-charging a battery 1 includes a source 2, a first controllable switch 3, connected between the source 2 and the battery 1, and a second controllable switch 4 connected across the battery 1. The apparatus further includes a means 5 responsive to a selected voltage at the terminals of the battery for controlling the operation of the switch 4 for selectively discharging the battery 1 between charging pulses.

The present invention will be described by using a battery comprised of one or more typical sub C sealed nickel cadmium cells. However, it is to be understood that this invention is not limited to charging sealed nickel cadmium cells. It is applicable to the charging of any rechargeable electrochemical power source.

A sub C nickel cadmium cell, such as the one used in battery 41B001KD06 manufactured by the General Electric Company, has a nominal voltage of 1.2 volts per cell and a nominal capacity of one ampere-hour when discharged at a rate of 100 milliamperes to a selected end voltage for a period of ten hours. The manufacturer recommends that this cell be charged at a C/10 rate, i.e., 100 milliamperes, for a period of sixteen hours. This time is excessive as this cell can be charged in considerably less time with negligible increase in temperature by employing the method of the present invention.

For the purposes of this application, C will be the rate of current at which a cell has been discharged in rating the cell to a selected end voltage in a selected period of time, which is generally one hour and ten hours. For example, the above cell has a C rate of one ampere whereby a selected end voltage is reached in one hour.

The method of the present invention can be advantageously employed to charge the cell to at least its nominal rated capacity in less than fifteen minutes, and has been used to charge such a cell to its nominal rated capacity in approximately six minutes.

Figure 2:
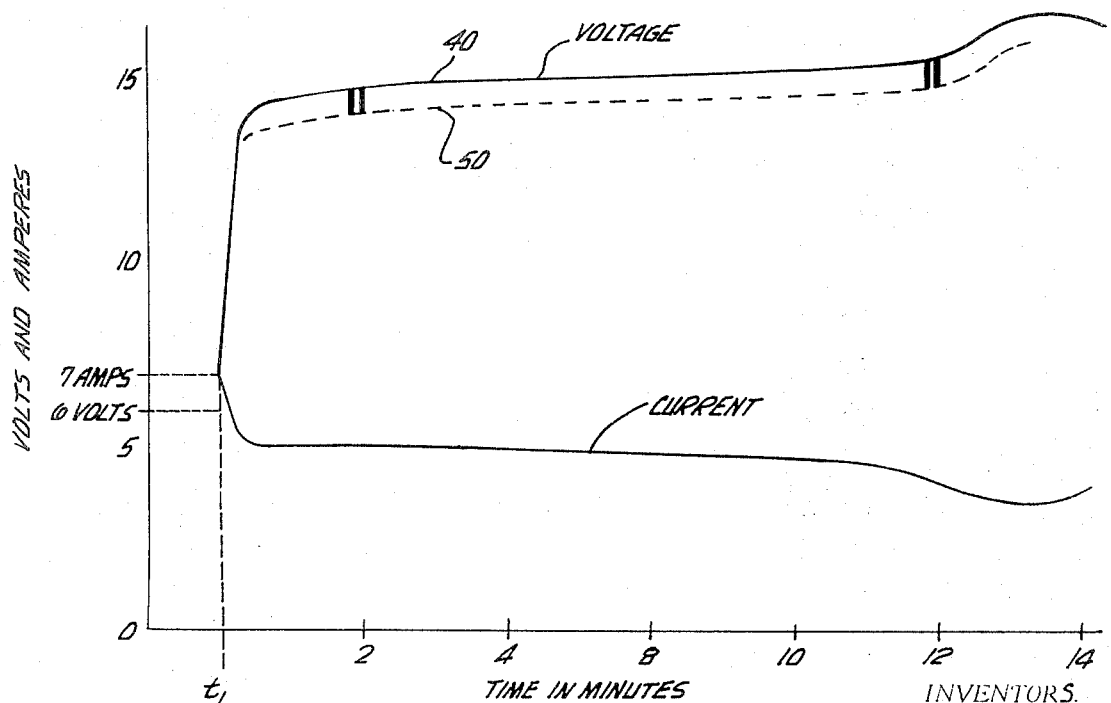
FIG. 2 is a graph showing the variations in battery terminal voltage and average charging current in the apparatus of FIG. 1 in accordance with the present invention.

The voltage at the terminals of a battery comprised of ten sub C cells and the charging current applied to the battery in accordance with the method of the present invention are shown in the chart of FIG. 2. For purposes of illustration, it is assumed that the battery to be charged was initially discharged to an end voltage of approximately six volts, and it is assumed that this is the terminal voltage of the battery at the time charge is initiated. The time of initiation of charge is representatively shown as time $t_1$ on the chart of FIG. 2. At time $t_1$ a charging current, that is in excess of the nominal one-hour rate of the battery, in this case approximately seven times C, is applied to the battery Upon application of the charging current the terminal voltage of the battery rises very rapidly from six volts to approximately fourteen volts. Thereafter, the terminal voltage tends to level off at about fifteen volts and remains at this voltage upon the continued application of charging current pulses. As the battery terminal voltage rises rapidly to the fourteen-volt point there is a corresponding decrease in the charging current to an average value of approximately five amperes.

The charging current is applied as pulses to the battery, which pulses may be produced by employing the pulsating direct-current voltage that appears at the output of a rectifier connected to an alternating-current voltage source. The resultant correspondence between charging current pulses and the pulsating direct-current voltage is shown in the charts of FIGS. 3 and 4, which charts have the same time base. Charging current will flow into the battery when the pulsating direct-current voltage from the source rises above the terminal voltage of the battery, which terminal voltage is shown to be approximately fifteen volts in the chart of FIG. 3.

For purposes of illustration, it is assumed that the pulsating direct-current voltage from the source has a peak value of approximately twenty volts so that charging current flows during approximately one-half of each pulse of direct-current voltage from the source. Thus, if the voltage is supplied through a step-down transformer connected to a standard 110-volt, 60-cycles per second or 60 Hertz line, the charging current will flow for approximately four milliseconds of the 8.3 millisecond direct-current voltage pulse duration.

While the discharge current in the copending application Ser. No. 726,060, filed May 2, 1968, was applied for a period of time longer than the time period of an input pulse from the voltage source, it has been found that a discharge pulse having a shorter time period has certain advantages. In particular, it has been found that the battery remains cooler during the charging cycle and that the battery may be substantially fully charged in less time. Also, it has been found, in particular, that batteries comprised of ten sub C cells can be fully charged to the level of 3600 ampere seconds in approximately six minutes.

In the case of the battery comprised of ten sub C cells, it has been found that the battery terminal voltage during the discharge pulse had a variation such that there was a high-frequency variation in voltage superimposed on the battery terminal voltage variation. This high-frequency variation is shown in FIG. 6 as a drawing of the waveform of the battery terminal voltage. The frequency of the superimposed voltage was found to be approximately four-tenths of a megacycle or four-tenths mHz. The cause of this high-frequency component is not known but it has been hypothesized that there may be some sort of resonance in the battery. To take advantage of this high-frequency component and possible resonance, the duration of the discharge pulse was selected to be approximately two microseconds which is the period of the four-tenth megacycle component.

By employing a discharge pulse having a duration of two microseconds it was found that the battery remained relatively cool. For example, over the entire charging cycle, the battery temperature generally increases somewhere between 5° F. and 15° F. Additionally, it was found that the time average value of the discharge pulse could be substantially less than the time average discharge pulse employed in the methods of the previous applications.

With a discharge pulse duration of only two microseconds the charging current does not have to be interrupted since the discharge pulse can fit between charging current pulses. This is shown in the chart of FIG. 4 of the drawings. The discharge pulse is shown on FIG. 4 as occurring immediately after a charge pulse. However, there may be a rest period before the discharge pulse is applied, and the pulse may occur toward the end of the period between charge pulses so that there is little rest period before the next charge pulse.

A battery charger for quick-charging batteries of one or more cells in accordance with the present invention is shown in schematic form in FIG. 1. As stated above, battery 1, to be charged, is connected to a source 2 through a controllable switch 3. The source 2, which provides a pulsating direct-current voltage for charging battery 1, may be any source that will provide a charging current to the battery being charged. Source 2 in this illustrative example includes a full-wave rectifier comprised of diodes 7 and 8 connected at opposite ends of a secondary 9 of a transformer 10. The primary 11 of the transformer is connected to an alternating-current source 12. The alternating-current source 12 may advantageously be the 60 cycles per second or 60 Hertz, alternating-current available from a wall plug. With a 60-cycle input and full-wave rectification the voltage waveform appearing at the output of the source 2 will have the form shown in FIG. 3 with a repetition rate of approximately 8.3 milliseconds.

The pulsating direct-current voltage is applied to the battery 1 through the controllable switch 3 which includes a silicon controlled rectifier 13, with a resistor 14 connected between the anode and gate of the rectifier 13, and a resistor 15 connected between the gate and cathode of the rectifier 13. When the output voltage from the source 2 exceeds the terminal voltage of battery 1 the silicon controlled rectifier 13 will be forward-biased. When the voltage from source 2 exceeds the battery terminal voltage, current will begin to flow through resistors 14 and 15 and through the gate-cathode junction of the silicon controlled rectifier 13 to gate rectifier 13 "on." Charging current will then flow into the battery 1 through rectifier 13 and will continue to flow as long as the output of the source 2 exceeds the terminal voltage of the battery 1.

In the illustrative example, the voltage appearing across one-half of the center-tapped secondary 9 of the transformer 10 has a peak value of twenty volts. However, the voltage applied to the battery 1 does not increase to the 20-volt peak value but is held down by the battery 1, which acts like a capacitor across the secondary of the transformer, and by the impedance of the secondary of the transformer through which the load current flows. The unloaded voltage across the secondary of the transformer, with a peak value of twenty volts, is shown as voltage curve 20 in FIG. 3. The voltage across the secondary with a battery for a load is shown as voltage curve 30 in FIG. 3. When the battery terminal voltage is approximately fifteen volts, it has been observed that the voltage developed by the charging current due to the resistance of the battery is approximately 0.8 volt so that the voltage rises approximately eight-tenths of a volt above the fifteen-volt value. The voltage rise will depend upon the condition of the battery, with a greater rise occurring when the battery being charged has a higher internal impedance, with the internal impedance generally being an indication of the condition of the battery and with higher internal impedances being associated with relatively poorer batteries.

When the charging current begins to flow into the battery 1, the terminal voltage rapidly rises from the value obtained immediately after discharge which, in the illustrative example, is assumed to be six volts. The terminal voltage of the battery will rapidly rise to approximately fourteen volts and then level off at around fifteen volts.

In accordance with the present invention the battery is discharged intermittently, which enhances the chargeability of the battery. Also, by applying the short discharge pulses, sandwiched between the charge pulses, it has been found that the battery temperature changes very little, e.g., 5° to 15° F. The battery is discharged through the discharge path provided by controllable switch 4, which may advantageously be a power transistor having its emitter-collector path connected across the battery, with the operation of the power transistor being controlled by the voltage-sensing circuit 5. The control circuit 5 acts similar to a relaxation oscillator and is responsive to the appearance of a selected voltage level across the terminals of the battery 1. Control circuit 5 includes a voltage divider comprised of resistors 16, 17, and 18 connected in series across the series connection of battery 1 and an inductor 19. The control circuit further comprises a timing capacitor 21 and a silicon controlled rectifier 22, with a current-limiting resistor 23 connected in the anode-cathode current path of the silicon controlled rectifier 22.

The appearance of the first discharge pulse by the closing of switch 4, which in this illustrative example, is a power transistor, is determined by the RC time constant of the control circuit 5, which is determined by the capacitance of capacitor 21 and the resistance of resistor 16 and inductor 19. As the battery terminal voltage increases, the charge on capacitor 21 increases and the voltage on the gate terminal of silicon controlled rectifier 22 between resistors 17 and 18 increases. When the voltage on the gate wtih respect to the cathode of silicon controlled rectifier 22 is of sufficient magnitude to gate "on" or fire the silicon controlled rectifier 22, current will flow from both the positive terminal of the battery 1 and from the capacitor 21 through the anode-cathode path of rectifier 22 to the base emitter junction of transistor 4, thereby turning on transistor 4. The biasing "on" of transistor 4 provides the discharge path across the battery 1. When silicon controlled rectifier 22 does fire, the capacitor 21 discharges and provides a large base current to power transistor 4 through rectifier 22. Thereafter, the combination of the base-drive impedance of transistor 4 in parallel with resistor 23 and the capacitance of capacitor 21 determines the duration of the discharge pulse by determining the length of time transistor 4 is forward biased. For the illustrative example, the pulse duration was set at approximately two microseconds.

The repetition rate of the discharge pulses established by the time constant of control circuit 5 is approximately one per second in the early stages of charging and increases as the battery charges. This repetition rate is not discernible on the curves of FIG. 2 because of the time base for the curves of FIG. 2. However, the application of discharge pulses with a resultant decrease in terminal voltage is representatively shown on the voltage curve 40 of FIG. 2. The terminal voltage of the battery decreases, and in the case of a relatively good ten-cell battery, the voltage decreased approximately eight-tenths of a volt during the application of the discharge pulse as shown by the dotted line 50 in FIG. 2.

The gating "on" of transistor 4 must be properly timed so that the closing of the discharge path does not occur while the silicon controlled rectifier 13 is in its "on" condition and charging current is being applied to the battery, because this would effectively place a short across the secondary of the transformer 10, which could easily damage the transformer. Thus, in this case, an inductor 19, is placed in the conduction path between the source 2 and the battery 1 and also between the gate and cathode of silicon controlled rectifier 22 to cause the firing of silicon controlled rectifier 22 between charging current pulses.

As the output voltage across the secondary 9 of transformer 10 decreases and approaches the battery terminal voltage, the conducting diode 7 or 8 will shut off. This is an abrupt shut-off which occurs while the inductor 19 is trying to conduct current. As a consequence a spike is generated across the inductor each time one of the diodes 7 or 8 and silicon controlled rectifier 13 shut off. The gate of silicon controlled rectifier 22 is approaching a threshold and the spike generated across the inductor 19 is sufficient to turn the silicon controlled rectifier 22 "on." In this way, the discharge pulse will occur almost immediately after charging current ceases to flow. However, if it is desired to delay the appearance of the discharge current pulse after the termination of the charge pulse, i.e., have a rest period between the charge pulse and the discharge pulse, the turning on of silicon controlled rectifier 22 and power transistor 4 may be delayed. In any event, the discharge pulse has a selected time duration which is less than the time interval between charging current pulses so that charging current is not interrupted but is permitted to flow each time the voltage from source 2 exceeds the battery terminal voltage. The discharge pulses occur approximately every one second wtih the repetition rate increasing as the charge progresses and the battery terminal voltage increases. This repetition rate may be varied by changing the time constants in the control circuit 5.

If it is desired to charge the battery in a relatively shorter period of time than the fourteen minutes shown in FIG. 2, the charging current may be increased. This will, of course, result in the terminal voltage of the battery increasing more rapidly so that the discharge pulses will occur more frequently. Batteries comprised of ten type sub C sealed nickel cadmium cells have been charged to the rated capacity of the battery in less than eight minutes by employing the method and apparatus of the present invention.

It is desirable to terminate the charge when the battery has been charged to its rated capacity or its full-charge condition. It has been found that when the battery approaches the full-charge condition there is a very rapid rise in the battery terminal voltage. It has been found that this rapid rise is a very reliable indicator of the full-charge condition of the battery since the temperature of the battery does not increase excessively during the charging process when the present invention is employed.

In batteries comprised of ten type sub C cells, by employing the present invention, there is a rapid voltage rise from approximately 15.8 volts to 17 volts in approximately one minute, which time of rise depends primarily upon the magnitude of charging current. Thus, for the ten cell battery of the illustrative example, a battery terminal voltage of approximately 16.3 volts was selected for indicating the time at which charging at high charge rates should be terminated. This voltage was selected to avoid the effects of excessive heating which may take place above seventeen volts for this type of cell. To effect such termination, a voltage-responsive switch 24, comprising a silicon controlled rectifier, is connected through a current-limiting resistor 25 to the gate of silicon controlled rectifier 13. The gate of silicon controlled rectifier 24 is connected to a voltage divider comprising Zener diode 29 and resistors 26 and 27 connected in series across the terminals of the battery 1. The cathode of rectifier 24 is connected to the negative terminal of the battery 1 on the opposite side of inductor 19 to the gate of the rectifier 24. By this connection and by providing a sufficient value of resistance in the charging current path, which resistance in the illustrative example of FIG. 1 is provided by the resistance of inductor 19, the charge termination circuit, including rectifier 24, will be triggered "on" only during the intervals that charge current is not flowing so that the circuit is responsive to the integrated time average voltage rather than the instantaneous voltage across the battery 1. When the rapid rise of terminal voltage occurs at the end of charge and the selected terminal voltage is attained, silicon controlled rectifier 24 is gated "on" to effectively bypass the gate current for silicon controlled rectifier 13. This prevents the rectifier 13 from again turning "on" as long as rectifier 14 is conducting so that the rapid charging is terminated.

However, it may be desirable to apply a trickle charge after the completion of the rapid charge cycle. To this end a relatively high resistance path is connected across switch 13 so that when switch 13 no longer conducts, a reduced current will flow into the battery. Furthermore, the relatively high resistance path may include, separately, or in combination with other elements, a lamp 28 that will glow more brightly when most of the current flows through this path instead of through rectifier 13 to provide a visual indication of the end of the rapid charge cycle.

A small amount of current, in the case of the illustrative example the current was approximately 140 milliamperes, flows through the parallel combination of lamp 28 and series resistors 14 and 15. Of this 140 milliamperes, approximately 100 milliamperes flow through the battery to trickle charge the battery. The remaining current is divided between the two voltage dividers of Zener diode 29 and series resistors 26 and 27 and series resistors 16, 17, and 18. The current through Zener diode 29 and series resistors 26 and 27 provides a holding current for silicon controlled rectifier 24 to continue the trickle charge for as long as is desired.

A capacitor 30 is connected across the gate-cathode junction of transistor 24 and cooperates with Zener diode 29 to provide temperature compensation for the apparatus. The voltage drop across the Zener diode 30 decreases as the temperature increases and offsets the increased sensitivity of the gate circuit of the rectifier 24 so that the selected end of rapid charge voltage (in the case of the illustrative example, 16.3 volts) stays the same for changes in temperature.

Various changes may be made in the details of construction without departing from the spirit and scope of the invention as defined in the appended claims.

What is claimed is:

1. Apparatus for rapidly charging a battery from a source of charge current pulses, said apparatus comprising a first controllable switch connected between the source and the battery; a second controllable switch connected across the battery; means for sensing the terminal voltage of the battery; means for sensing the flow of charge current through the battery; and means responsive to both sensing means for controlling the operation of said second controllable switch for discharging the battery.

2. Apparatus in accordance with claim 1, wherein the first controllable switch is a silicon controlled rectifier.

3. Apparatus in accordance with claim 1 wherein the second controllable switch is a power transistor.

4. Apparatus in accordance with claim 1, further including means for inhibiting said first controllable switch in response to the attainment of a selected battery terminal voltage during charge to terminate charge.

5. Apparatus in accordance with claim 1, further including a path in parallel with said first controllable switch for providing trickle charge current to said battery, and means to inhibit the operation of said first controllable switch in response to the attainment of a selected battery terminal voltage during charge to convert from a rapid charge to a trickle charge.

6. Apparatus for rapid charging a battery having one or more cells, an inductor, a first controllable switch, a source of pulsating direct-current voltage connected to the battery through said switch on one side and through said inductor on the other side for providing charging current pulses, a second controllable switch connected across said battery, means responsive to the voltage across said battery and said inductor for closing said second switch, means for holding said second switch closed for a period of time less than the interval between charging pulses, and means responsive to a selected level of voltage across the battery between charging pulses for inhibiting said first switch to terminate charge through said switch.

7. A method of rapidly charging a battery comprising transmitting direct current pulses to a battery through an electrical connection; providing a first sensing means responsive to a function of said battery; providing a second sensing means responsive to the termination of a direct current pulse supplied to said battery; said second sensing means cooperating with said first sensing means to connect said battery with a load during an increment between the transmission of adjacent direct current pulses to said battery.

8. A method of rapidly charging a battery comprising transmitting direct current pulses to a battery through an electrical connection; providing a first sensing means responsive to a function of said battery; providing a second sensing means responsive to the termination of a direct current pulse supplied to said battery; said second sensing means cooperating with said first sensing means to selectively connect said battery with a load during an increment between the transmission of adjacent direct current pulses to said battery; and limiting the time of connection of said load means to said battery to an increment not exceeding the increment between said adjacent direct current pulses.

9. A method of rapidly charging a battery comprising imparting a progressively increasing charge to a battery by subjecting said battery to alternating, charging and discharging intervals; during each of said charging intervals transmitting direct current pulses to said battery through an electrical connection; imparting said discharging intervals to said battery by connecting said battery to a load means between said charging intervals by switch means, with said switch means being controlled as a function of a battery condition and as a function of the termination of a direct current pulse applied to said battery during a charging interval; and limiting each of said discharging intervals to a duration not coextensive with any of said direct current pulses of said charging intervals.

10. A rapid battery charging circuit comprising circuit means operable to direct current pulses to a battery through an electrical connection; load means; and discharge means for periodically electrically connecting said battery to said load means without interrupting said electrical connection between said battery and said circuit means, said discharge means including first control means operable in response to a battery function, and second control means operable in resposne to the termination of direct current pulses supplied to said battery, said second control means cooperating with said first control means to operably electrically connect said battery with said load means during an increment between the supplying of adjacent direct current pulses to said battery.

11. A rapid battery charging circuit comprising source means for supplying direct current pulses to a battery when the voltage level of said pulses exceeds the terminal voltage of said battery; a load; first means responsive to a battery function; second means responsive to a relationship between the voltage level of said direct current pulses and said battery terminal voltage; circuit means responsive to said first and second means for connecting said battery to said load; and control means for limiting the connection of said battery to said load to a period of time not coextensive with any of said direct current pulses.

12. The battery charging circuit of claim 11 wherein said second means is responsive to the termination of a current pulse applied to said battery.

13. The battery charging circuit of claim 11 wherein said first means includes capacitor means for integrating a current related to a battery terminal voltage with respect to time.

14. The battery charging circuit of claim 13 wherein said second means is operable to generate a current transient additive in polarity to a charge on said capacitor means, said circuit means being operable to connect battery to said load in response to a total charge on said capacitor means, including said transient additive, which total charge exceeds a predetermined value.

15. The battery charging circuit of claim 14 wherein said second means includes inductance means in series with said capacitance means, with said current transient being generated in said inductance means in response to the termination of a current pulse applied to said battery.

16. The battery charging circuit of claim 15 including means operable in response to the attainment of a predetermined battery terminal voltage to reduce the current applied from said source to the battery.

17. A method for rapidly charging a battery comprising transmitting direct current pulses to a battery; developing a first control signal in response to a function of said battery; developing a second control signal in response to the transmission of direct current pulses to said battery; developing a third control signal in response to the termination of a direct current pulse supplied to said battery, said second control signal cooperating with said first control signal to provide a composite control signal operable to prevent the application of a discharge path across said battery during the transmission of each direct current pulse to said battery, said third control signal cooperatnig with said first control signal to provide a second composite control signal operable to electrically connect a discharge path across said battery during an increment between the transmission of adjacent current pulses to said battery.

18. A method for rapidly charging a battery comprising transmitting direct current pulses to a battery; developing a first control signal in response to a function of said battery; developing a second control signal in response to the transmission of direct current pulses to said battery, said second control signal cooperating with said first control signal to provide a composite control signal operable to prevent the application of a discharge path across said battery during the transmission of each direct current pulse to said battery.

References Cited

UNITED STATES PATENTS

| 2,503,179 | 4/1950 | Tichenor | 320—14 |
| 3,226,623 | 12/1965 | Krueger et al. | 320—43 |
| 3,281,638 | 10/1966 | Crawford | 320—TD(UX) |
| 3,300,704 | 1/1967 | McMillen | 320—61 |
| 3,363,163 | 1/1968 | Nord et al. | 320—40X |

JAMES D. TRAMMELL, Primary Examiner

J. M. GUNTHER, Assistant Examiner

U.S. Cl. X.R.

320—5, 9, 24, 39

UNITED STATES PATENT OFFICE
CERTIFICATE OF CORRECTION

Patent No. 3,559,025       Dated January 26, 1971

Inventor(s) Wilford B. Burkett et al.

It is certified that error appears in the above-identified patent and that said Letters Patent are hereby corrected as shown below:

On the 3 sheets of drawings, lower right-hand corner, "JOHN BIGBEE,III" should read -- JOHN H. BIGBEE,III --. In the heading to the printed specification, line 3, "John Bigbee III should read -- John H. Bigbee III --; lines 7 and 8, cancel "Continuation-in-part of applications Ser. No. 612,995, Jan. 31, 1967, and Ser. No. 726,060, May 2, 1968.". Column 3, line 71, "battery" should read -- battery. --. Column 7, line 6, "wtih" should read -- with --. Column 8, line 42, beginning with "4. Apparatus" cancel all to and including "said switches in line 65, same column 8. Columns 8, 9 and 10, the claims numbered 7 through 18 should be renumbered 4 through 15. Column 9, line 30, after "to", first occurrence, insert -- supply -- Column 10, line 31, "cooperatnig" should read -- cooperating In the heading to the printed specification, line 11, "18 Cla: should read -- 15 Claims --.

Signed and sealed this 14th day of September 1971.

(SEAL)
Attest:

EDWARD M. FLETCHER, JR.        ROBERT GOTTSCHALK
Attesting Officer              Acting Commissioner of Pat